US006289747B1

(12) United States Patent
Billen et al.

(10) Patent No.: US 6,289,747 B1
(45) Date of Patent: Sep. 18, 2001

(54) PRESSURE-SENSITIVE AREA SENSOR

(75) Inventors: Karl Billen, Körperich (DE); Laurent Federspiel, Asselschever (LU); Edgard Theiss, Kelmis (BE); Reinhard Knecht, Mettendorf (DE)

(73) Assignee: I.E.E. International Electronics & Engineering S.A.R.L., Luxembourg (LU)

( * ) Notice: Subject to any disclaimer, the term of this patent is extended or adjusted under 35 U.S.C. 154(b) by 0 days.

(21) Appl. No.: 09/629,178

(22) Filed: Jul. 31, 2000

Related U.S. Application Data

(63) Continuation of application No. PCT/EP99/00260, filed on Jan. 18, 1999, and a continuation of application No. PCT/EP99/00443, filed on Jan. 23, 1999.

(30) Foreign Application Priority Data

Jan. 30, 1998 (LU) .......................................................... 90200

(51) Int. Cl.[7] .......................................................... G01L 5/04
(52) U.S. Cl. .......................................................... 73/862.046
(58) Field of Search ........................ 73/862.041, 862.042, 73/862.043, 862.044, 862.045, 862.046

(56) References Cited

U.S. PATENT DOCUMENTS

| | | | | |
|---|---|---|---|---|
| 4,014,217 | * | 3/1977 | Lagasse et al. | 73/865.7 |
| 4,539,544 | * | 9/1985 | Rapp | 335/296 |
| 4,644,801 | * | 2/1987 | Kustanovich | 73/862.046 |
| 4,839,512 | * | 6/1989 | Speck | 250/231.1 |
| 4,843,891 | * | 7/1989 | Brunner et al. | 73/862.046 |
| 5,010,774 | | 4/1991 | Kikuo et al. . | |
| 5,323,650 | | 6/1994 | Fullen et al. . | |

FOREIGN PATENT DOCUMENTS

4237072 C1 12/1993 (DE) .

* cited by examiner

*Primary Examiner*—Max Noori
(74) *Attorney, Agent, or Firm*—Venable; George H. Spencer

(57) ABSTRACT

A pressure sensitive area sensor having a two-dimensional support structure which is made up essentially of flexible strips and of several pressure-sensitive switching elements which are distributed over the area of the supporting structure, with the switching elements being connected to each other by connecting means. The pressure-sensitive switching elements are supported, at least where the supporting structure is subjected to large three-dimensional deformations, by free-standing projections of the connecting strips.

15 Claims, 1 Drawing Sheet

PRESSURE-SENSITIVE AREA SENSOR

CROSS-REFERENCE TO RELATED APPLICATION

Figure 1:
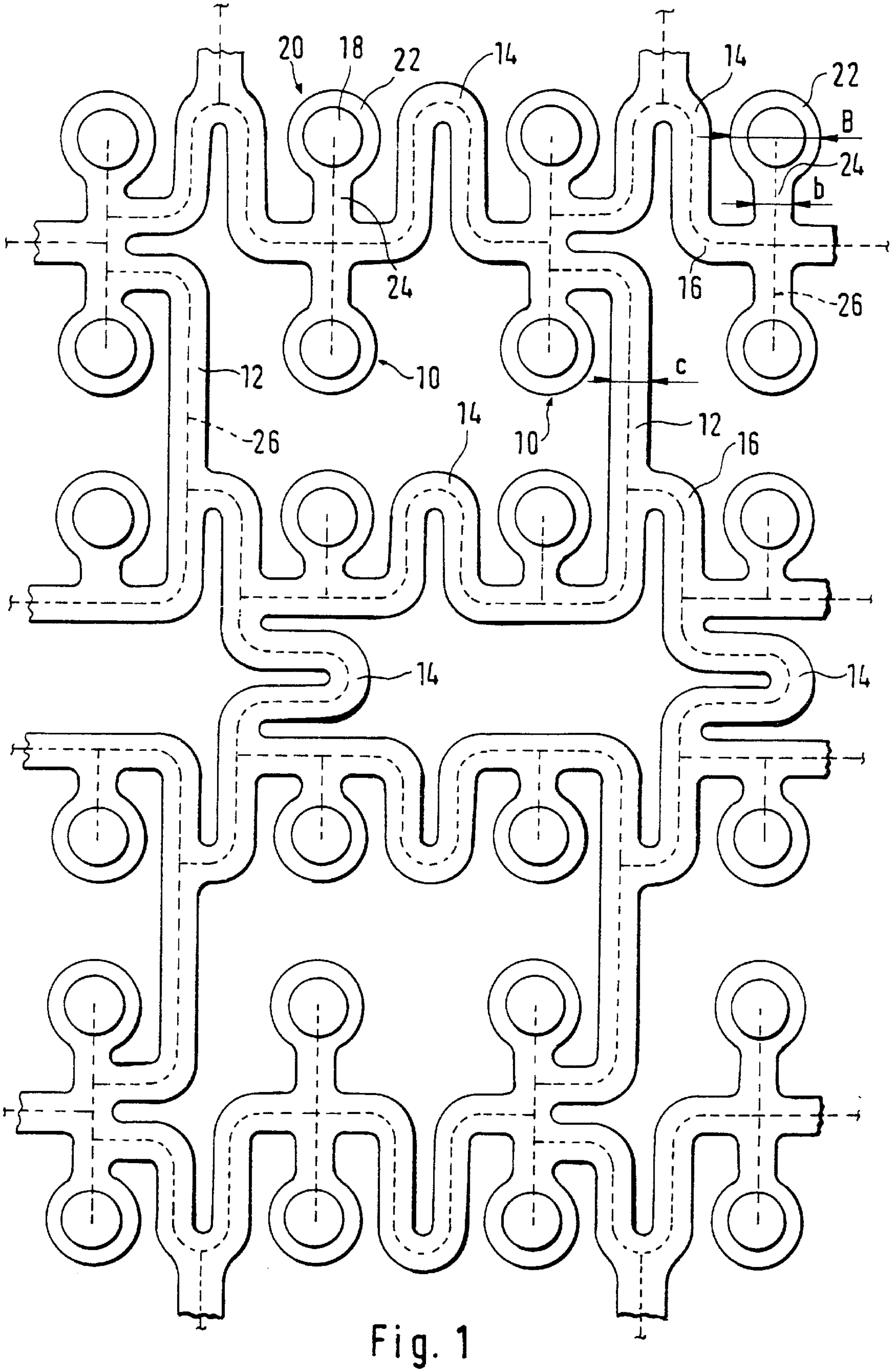

This application is a continuation of International Application No. PCT EP99/00260 filed Jan. 18, 1999, and a continuation of PCT/EP99/00443, filed Jan. 23, 1999, the entire specification of which is incorporated herewith by reference.

The invention relates to a pressure-sensitive area sensor.

Sensors of this type are currently used e.g. to detect occupation or record a pressure profile in car seats in order to control the tripping of an air bag. In this case they are placed on deformable seat upholstery or integrated in the latter and are designed to detect whether and if necessary how the seat is under load. The body size and sitting posture of the seated person, for example, can then be derived from the determined pressure profile.

Already known sensors of this generic type comprise a sheet-type supporting structure, over the area of which several pressure-sensitive switching elements are distributed. The latter form the pressure-sensitive areas. To permit adaptation of the two-dimensional supporting structure to a three-dimensional supporting area, it is already known to use a supporting structure which consists only of strip-type connecting paths held together by an outer frame. The pressure-sensitive switching elements are integrated in the strip-type approximately 2 cm wide connecting paths.

It has bee n established that the response behaviour of the switching elements is affected by deformations of the supporting structure in these already known area sensors.

Hence the present invention is based on the task of improving the response behaviour of the switching elements in the pressure-sensitive area sensors described above.

According to the invention this problem is solved by an area sensor according to claim 1.

A pressure-sensitive area sensor of this type comprises a two-dimensional supporting structure, which consists substantially of flexible connecting paths, and several pressure-sensitive switching elements, which are distributed over the area of the supporting structure. According to the invention the pressure-sensitive switching elements are supported by free-standing projections on the connecting strips at least where the supporting structure is subjected to larger three-dimensional deformations.

Compared to already known pressure-sensitive area sensors, in which the switching elements are integrated in the connecting paths, the effect of deformations of the supporting structure on the switching elements is attenuated in the area sensors according to the invention. The switching elements on the free-standing projections of the connecting strips are in fact mechanically disconnected from the supporting structure to a certain degree. This means that the two-dimensional supporting structure can adapt to a three-dimensional supporting area (such as seat upholstery) and to its deformations without causing larger parasitic loads on the switching elements. In other words the switching elements are no longer pre-loaded by mechanical stresses in the connecting paths, which are caused by deformations of the supporting structure. Consequently their response behaviour is substantially improved. Furthermore, it should be noted that compared to already known area sensors, in which the switching elements are integrated in the connecting strips, the width of the connecting strips may be far smaller than the width (or diameter) of the switching elements in the area sensor according to the invention. In other words the width of the connecting strips is determined solely by their connection function and not by the dimension of the switching elements in the sensor according to the invention. Narrower connecting strips are less resistant to deformation, so that three-dimensional deformations of the supporting structure produce smaller mechanical stresses, which may impair the response behaviour of the switching elements. The adaptation of the two-dimensional area sensor to a three-dimensional supporting area is, of course, also improved by better three-dimensional deformability of the area sensor. When the area sensor is used in an upholstered seat, e.g. to detect occupation of the seat or record a pressure profile, the area sensor according to the invention produces more comfortable sitting by improved deformability and smaller coverage of the seat area.

In an advantageous embodiment of the area sensor the narrow connecting strips incorporate deformation loops or deformation curves. These deformation elements also improve the deformability of the connecting strips and thus produce even better adaptation of the two-dimensional supporting structure of the sensor to a three-dimensional supporting area. As the resistance of the connecting strips to deformation is thus greatly reduced, the latter do not transmit any significant bending moments or torsional moments, which cause parasitic loads in the switching elements.

The deformation loops are advantageously each arranged in a connecting strip between two projections, so that a compressive force acting locally on a switching element in a first projection does not cause a mechanical load on the switching element in the adjacent projection. By arranging the deformation element immediately in front of a projection it is ensured that no significant bending and torsional moments are transmitted to the projection.

The projections advantageously comprise a head section, which carries the switching element, and a connecting link, which connects the head section to the connecting path. The dimension of the connecting link perpendicular to the connection direction should preferably be smaller than the corresponding dimension of the head section. This tapering of the projection in the area of the connecting link ensures that the latter is more flexible than the head section, with the result that residual deformations are essentially absorbed by the connecting link and have no significant effects on the switching element. In addition the connecting link of the projection can be perpendicular to the connecting path, with the result that the mechanical uncoupling between head section and connecting strip is further improved.

The supporting structure advantageously comprises connecting strips arranged like a grid, which are connected to each other via deformation loops or curves. This grid-type arrangement of the connecting strips permits uniform distribution and advantageous connection of the switching elements. In addition the grid-type supporting structure has essentially the same deformability in two perpendicular directions. Consequently more uniform adaptation of the area sensor to a three-dimensional supporting surface is achieved.

The pressure-sensitive switching elements advantageously have electrical connecting leads which are integrated in the connecting paths. In a preferred embodiment the supporting structure consists of two sheets glued together, connecting leads and switching elements being arranged between the two sheets.

The area sensor preferably comprises pressure-sensitive resistance sensors, which are known inter alia by the name "Force Sensing Resistors (FSR)". The resistance of an FSR sensor of this type is dependent on the compressive force acting on it. Resistance sensors of this type comprise, for example, a planar electrode, an area coated with semi-conductor material, which is opposite the planar electrode, and a spacer. The spacer ensures that the planar electrode and the semi-conductor material are not contacted when the switching element is not actuated. In the case of a compressive load on the FSR sensor the contact resistance diminishes with increasing compressive force. The planar electrode of the FSR sensor can be mounted on a first sheet and the semi-conductor material surface on a second sheet, the first and second sheet being separated by a spacer sheet.

An area sensor according to the invention is used advantageously, e.g. in an upholstered seat to detect occupation or to record a pressure profile, the area sensor resting on the upholstery or being integrated in the latter. The high flexibility of the supporting structure and the small width of the connecting strips ensure more comfortable sitting compared to already known pressure-sensitive area sensors.

The high flexibility of the supporting structure and the fact that the individual switching elements are largely mechanically uncoupled from each other make the area sensor suitable for recording of pressure profiles on three-dimensional surfaces.

Further advantages and features of the invention can be derived from the following description of an exemplified embodiment with reference to the enclosed drawing.

FIG. 1 shows a section of an area sensor with several pressure-sensitive areas.

FIG. 1 shows a section of a pressure-sensitive area sensor, as can be used, for example, to detect occupation or to record pressure profiles in car seats, inter alia to control the tripping of an air bag. The pressure-sensitive area sensor is placed on the seat upholstery or integrated in the latter in this case. It permits detection whether and at what points the seat is under load. A pressure profile can be plotted for the seat area by measurement of the compressive load at the pressure-sensitive points of the area sensor. The body size and sitting posture of the seated person, which are important parameters for intelligent control of tripping of an air bag, can then be derived from this pressure profile.

The area sensor shown comprises a sheet-type supporting structure, which consists essentially of a large number of relatively narrow connecting strips 12 arranged like a grid. These connecting strips 12 incorporate deformation loops 14 or deformation curves 16, which are arranged in such a way that the supporting structure can deform three-dimensionally. In other words the supporting structure can adapt itself to the profile of a three-dimensional surface.

Pressure-sensitive switching elements 18 are arranged outside the connecting strips 12 in free-standing projections 20 on the connecting strips 12. Such a projection 20 advantageously comprises a head section 22 which carries the switching element 18, as well as a connecting link 24, which connects the head section 22 to a connecting strip 12. It should be noted that the dimension "b" of the connecting link 24 perpendicular to the connection direction is smaller than the corresponding dimension "B" of the head section 22. Consequently the connecting link 24 is more flexible in the connection direction than the head section 22. It should likewise be noted that the width of the connecting strips "c" is substantially smaller than the dimension "B" of the head section 22. It should also be noted that the deformation elements 14, 16 between adjacent projections 20 uncouple the latter as it were mechanically from each other. In other words the switching elements 18 can be largely applied to a three-dimensional supporting area without production of large bending moments or torsional moments in the supporting structure, which lead to preloading of the switching elements 18.

The switching elements 18 are preferably sensors which are known inter alia by the name "Force Sensing Resistors (FSR)". These "FSR" comprise in a known way e.g. an area electrode (e.g. a graphite or silver electrode), a surface coated with semi-conductor material, which lies opposite the planar electrode, and a spacer. The spacer ensures that the planar electrode and the semi-conductor material are not in contact when the switching element is not actuated. If a compressive force acts on such an FSR, however, its planar electrode is brought into contact with the semi-conductor material surface. The contact resistance diminishes as the pressure increases.

Electrical connecting leads of the switching elements 18 are designated 26 in FIG. 1. These connecting leads 26 are integrated in the connecting strips and connecting links, the grid structure of the connecting strips 12 permitting matrix-type connection of the switching elements 18. It should be noted that for the sake of simplicity the connecting leads are shown only schematically as a single broken line in FIG. 1. In practice several parallel connecting lines 26, via which the switching elements 18 can each be connected individually to an electronic evaluator, run through a connecting path.

The sensor with FSR sensors shown in FIG. 1 comprises a supporting structure consisting of three sheets with good flexibility and insulation properties laminated on each other. The middle sheet forms the spacer for the FSR sensors. For this purpose a hole, which coincides with the active zone of the respective FSR sensor, is provided in each head section 22. The electrodes with their connecting leads or the semi-conductor surfaces with their connecting leads are each mounted on the side of both outer foils facing the middle foil. It should be noted that the grid structure described above is punched out of the ready glued "sandwich sheet".

If the area sensor described above is placed on seat upholstery, it can be excellently adapted to the three-dimensionally deformable supporting surface by the narrow connecting strips 12 and the deformation elements 14, 16. In this case deformations of the connecting strips 12 occur virtually exclusively in the area of their deformation elements. Due to the low resistance of the connecting strips to deformation, however, these deformations produce no significant bending moments or torsional moments in the supporting structure, which would lead to parasitic loads in the switching elements 18 in their free-standing projections 20. Sitting comfort is, of course, likewise improved by the excellent deformability of the supporting structure.

The pressure-sensitive area sensor described above can, of course, also be used in other fields to record pressure profiles. A further application is, for example, recording the pressure profiles of feet in shoes.

What is claimed is:

1. Pressure-sensitive area sensor comprising a two-dimensional supporting structure consisting substantially of flexible connecting strips (12), and several pressure-sensitive switching elements (18), which are distributed over the area of the supporting structure (12), the switching elements (18) being connected to each other by the connecting strips (12); characterised in that the pressure-sensitive switching elements (18) are supported, at least where the supporting structure is subjected to larger three-dimensional deformations, by free-standing projections (20) of the connecting strips (12).

2. Sensor according to claim 1, characterised in that the connecting strips (12) comprise deformation loops (14) or deformation curves (16).

3. Sensor according to claim 2, characterised in that the deformation loops (14) are each arranged in a connecting strip (12) between two projections (20).

4. Sensor according to one of claim 1, characterised in that the projections (20) comprise a head section (22), which carries the switching element (18), and a connecting link (24) which connects the head section (22) to the connecting strip (12), the dimension ("b") of the connecting link (24) perpendicular to the connection direction being smaller than the corresponding dimension of the head section ("B").

5. Sensor according to claim 4, characterised in that the connecting link (24) is perpendicular to the connecting strip (12) to which it is connected.

6. Sensor according to claim 5, characterised in that the connecting strip (12) forms a deformation element (14, 16) immediately in front of a junction of a connecting link (24) to the connecting strip (12).

7. Sensor according to claim 1, characterised in that the support structure comprises connecting strips (12) in a grid arrangement, said connecting strips being connected to each other via deformation elements (14, 15).

8. Sensor according to claim 1, characterised in that the pressure-sensitive switching elements (18) are provided with electrical connecting leads (26), which are integrated in the connecting strips (12).

9. Sensor according to claim 1, characterised in that the supporting structure comprises two glued sheets and that the connecting leads (26) and switching elements (18) are arranged between the two sheets.

10. Sensor according to claim 1, characterised in that the switching elements (18) are pressure-sensitive resistance sensors.

11. Sensor according to claim 10, characterised in that the switching elements (18) comprise a planar electrode, a surface coated with semi-conductor material, which lies opposite the planar electrode, and a spacer.

12. Sensor according to claim 11, characterised in that the planar electrode is placed on a first sheet and the semiconductor surface on a second sheet, the first and second sheets being separated by a spacer sheet.

13. Use of the area sensor according to claim 1 to record a pressure profile.

14. Use of the area sensor according to claim 1 in an upholstered seat.

15. Use of the area sensor according to claim 1 to record a pressure profile in shoes.

* * * * *